United States Patent [19]

Feinberg et al.

[11] Patent Number: 5,317,630
[45] Date of Patent: May 31, 1994

[54] INTERFACE FOR A DATA TELEPHONE AND DATA TERMINAL IN A DIGITAL TELEPHONE SYSTEM

[75] Inventors: Lee A. Feinberg, Manalapan; Yiu K. Leung, Aberdeen, both of N.J.

[73] Assignee: AT&T Bell Laboratories, Murray Hill, N.J.

[21] Appl. No.: 580,238

[22] Filed: Sep. 10, 1990

[51] Int. Cl.⁵ .......................................... H04M 11/00
[52] U.S. Cl. ........................................ 379/94; 379/93; 379/96; 379/142; 379/210; 379/211; 370/110.1
[58] Field of Search ................... 379/94, 96, 98, 93, 379/210, 211, 212, 142, 219, 220, 221, 242, 243; 370/110.1, 110.2, 110.3

[56] References Cited

U.S. PATENT DOCUMENTS

| | | | |
|---|---|---|---|
| 4,812,839 | 3/1989 | Okada et al. | 340/825.14 |
| 4,893,336 | 1/1990 | Wuthnow | 379/210 |
| 5,023,868 | 6/1991 | Davidson et al. | 379/94 |
| 5,029,196 | 7/1991 | Morganstein | 379/210 |
| 5,062,103 | 10/1991 | Davidson et al. | 379/94 |
| 5,065,425 | 11/1991 | Lecomte et al. | 379/96 |

OTHER PUBLICATIONS

*PC Magazine*, Feb. 13, 1990, "Building Network Solutions: Is ISDN Tomorrow's Interoffice Network?", pp. 229-254.

Primary Examiner—Curtis Kuntz
Assistant Examiner—Stella L. Woo
Attorney, Agent, or Firm—Samuel R. Williamson

[57] ABSTRACT

A data terminal interface for a terminal adapter and an attached computer provides complete flexibility and control of information in a communication environment for a user. Communications between the terminal adapter and a digital network may be provided in existing digital systems, such as either the Digital Communications Protocol or Integrated Services Digital Network system, for example. The data terminal interface facilitates the exchange of information between the terminal adapter and the computer via an asynchronous data module in the terminal adapter. Through the data terminal interface, the computer is able to directly control user interface circuitry in the terminal adapter by responding to and sending unlimited information to this interface circuitry since conformance to a digital protocol is not required for message traffic between these two units. Also the data terminal interface permits all functions that a user is able to perform at the terminal adapter, such as going off-hook, pressing a button, etc., to be performed by the computer and provided to the network. Specific applications such as call screening, custom alerting and automatic call distribution are easily achieved through use of the data terminal interface.

28 Claims, 4 Drawing Sheets

INTERFACE FOR A DATA TELEPHONE AND DATA TERMINAL IN A DIGITAL TELEPHONE SYSTEM

BACKGROUND OF THE INVENTION

1. Technical Field

This invention relates to digital voice communication systems and, more particularly, to an arrangement for providing a communication interface for a data telephone and data terminal equipment for operation within such system.

2. Description of the Prior Art

Communication today is shaped by changes in two fundamental areas: user need and evolving technologies. Communication has shifted from an efficiency tool to a competitive necessity. It has also shifted from a focus on data availability to a broader scope of information management.

Current users are seeking increased flexibility and control in their communication environment. The ability to tailor communication applications to specific need and to change these applications rapidly are desired. These communication goals are achievable to some degree with existing data or digital telephones which utilize protocols such as AT&T's Digital Communications Protocol (DCP) or the Integrated Services Digital Network (ISDN) protocol promulgated by the International Telephone and Telegraph Consultative Committee (CCITT). These protocols respectively specify the user-network interface in defining such things as signaling (call setup) and data transfer formats for each interface in a communication link. Even though some flexibility and control are available in existing data telephones employing these protocols, the full potential of data telephones has not yet been realized by those arrangements currently available in the art.

A considerable level of flexibility and control is provided to a communication environment through currently available integrated voice and data workstations which connect to digital networks. Each workstation generally comprises a computer configured to work in a digital environment and a digital telephone connected to the computer. The computer is typically configured by a digital interface card specifically designed for the type of digital protocol with which it operates. And both the digital network and the digital telephone connect to the computer through this interface card for providing voice communications for a user.

One disadvantage in this workstation arrangement is that the computer is not able to implement some of the local features often desired by a user of the digital telephone, these features typically being defined by softkeys at the telephone. In a workstation employing an ISDN protocol, for example, messages compatible with CCITT Recommendations Q.931 are provided between the digital telephone and the computer and also between the computer and the digital network, the computer being interposed between the telephone and the network. Since all messages between the computer and the telephone must be in the protocol defined by these CCITT Recommendations, personal customization by providing features at the telephone other than those defined in the protocol is not permitted.

Another disadvantage in this arrangement is that the application software in the computer must fully understand the CCITT Recommendations Q.931 in order to be completely compatible with all signals in this format generated by both the digital network and the digital telephone. Since a program fully incorporating this recommendation is necessarily large, it limits the amount of memory in the computer that would otherwise be available for other data processing applications, or, alternatively, it requires the use of a more powerful and expensive computer having the appropriate data processing capability.

Also available in the art is a terminal adapter that provides increased flexibility and control in communicating directly with a digital network. The terminal adapter may be a device such as an ISDN telephone with an asynchronous data module for interfacing with a computer. A data terminal interface in the terminal adapter is arranged to interface with the computer in controlling those functionalities defined by CCITT Recommendations Q.931 for originating and answering a call, including such switching features as conference, transfer, call forwarding and electronic directory service. The data terminal interface also cooperates with and provides the computer with information received from the network in accordance with CCITT Recommendations Q.931, including the providing of such information as calling party name, directory number and feature status.

Like the above described workstation arrangement, this terminal adapter arrangement has the disadvantage that the associated computer is not able to implement the local features often desired by a user of the digital telephone, since the messages between the computer and the digital telephone must be in the digital protocol defined by, for example, the CCITT Recommendations and are therefore limited to these features.

Another disadvantage in this terminal adapter arrangement is that implementation of the call switching features provided by the computer also generate appearance signals at the output display of the terminal adapter. Thus if an incoming call is to be rerouted to another telephone by the computer, for example, during receipt of this incoming call from the network, the call message is routed to the computer as desired. This same call message is also simultaneously routed through the terminal adapter to display circuitry in this arrangement, however. Such action as either a visual or audible alerter in the terminal adapter is therefore activated, albeit briefly, alerting a user to respond even though this action in this instance is not desired. Outgoing call messages by the computer also generate undesirable appearance signals at the output display of the terminal adapter in this arrangement.

SUMMARY OF THE INVENTION

In accordance with the present invention, a data terminal interface for a terminal adapter, such as a data telephone, and an attached computer provides total flexibility and control of information in a communication environment for a user. Communications between the terminal adapter and a digital network may be over known digital systems, such as either the DCP or ISDN system, for example. The data terminal interface facilitates the exchange of information between the terminal adapter and the attached computer via an asynchronous data module in the terminal adapter. Also the data terminal interface permits all functions that a user is able to perform at the terminal adapter, such as going off-hook, pressing a button, etc., to be performed by the attached computer and provided to the network.

In accordance with the invention, a data terminal interface in a terminal adapter arranged for attaching to a digital network and to a data terminal comprises means for receiving an incoming control message from the digital network for a user interface in the terminal adapter, means for routing said incoming control message from the digital network to the data terminal, and means for generating at the data terminal a substitute message for forwarding to the user interface.

Specific applications such as call screening, customized user interface, and automatic call distribution are provided in accordance with the invention. In the operation of call screening, a user may choose to configure the computer such that it either alerts the user with a custom ringing pattern, a normal ringing pattern or does not alert the user at all in accordance with the calling party's number and other information received from the network or stored in the computer. The customized user interface application allows the computer to directly control user interface circuitry in the terminal adapter, this circuitry being that which interfaces with, for example, a display, lamps, buttons, and an audible alerter in the terminal adapter. In this interface application, the computer is able to respond to and send unlimited information to the user interface circuitry since conformance to a digital protocol is not required for message traffic between these two units. The customized user interface also allows the computer to respond to information received from the network for the user interface circuitry and then send information other than that received from the network on to the user interface circuitry for display or signaling as appropriate. The customized user interface also enables the computer to treat a button-press from the terminal adapter as an operation for which only the computer needs to respond rather than the computer having to provide this button-press signal to the network. In the automatic call distribution application, multiple terminal adapters are attached to one controlling computer that handles the processing of incoming and outgoing calls and appropriately controls the user interface circuitry of each attached terminal adapter.

BRIEF DESCRIPTION OF THE DRAWING

This invention and its mode of operation will be more clearly understood from the following detailed description when read with the appended drawing in which.

Throughout the drawing, the same element when shown in more than one FIG. is designated by the same reference numeral.

DETAILED DESCRIPTION

Figure 1:
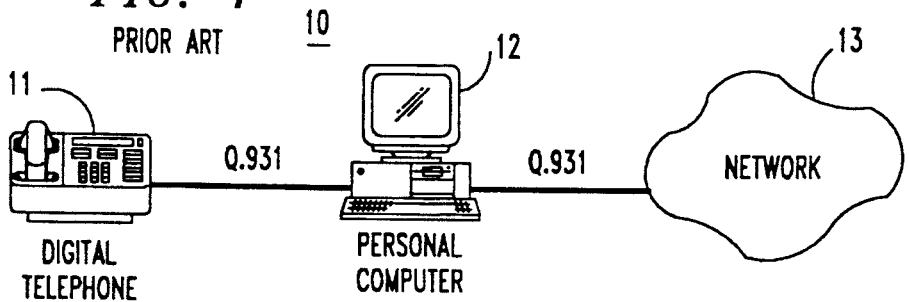
FIG. 1 shows a prior art integrated voice and data workstation comprising a digital telephone and a personal computer connected to a digital network.

Referring to FIG. 1, there is shown a prior art integrated voice and data workstation 10 comprising a digital telephone 11 and a personal computer 12 connected to a digital network 13. CCITT Recommendation Q.931 (I.451 Network Layer Specification) defines the ISDN protocol for user-to-network signaling over a first line connecting the digital telephone 11 and the computer 12 as well as over a second line connecting the computer 12 and the network 13. This protocol specifies procedures for establishing, maintaining and clearing network calls and connections.

In accordance with CCITT Recommendations, operation of the workstation 10 is over a Basic Rate Interface which consists of two 64 Kbps B-channels and one 16 Kbps D-channel used for the call setup and teardown for both of the B-channels. An interface card (not shown) capable of receiving and transmitting Q.931 specification messages is employed in the computer 12 along with suitable software, also in the computer, for providing ISDN access for the workstation. The Q.931 messages for the digital telephone 11 are provided by the network 13 to the computer 12 which, in turn, passes these messages on to the telephone 11 in accordance with the Q.931 specification message format. Similarly, all messages originating at the digital telephone 11 for the network 13 are passed on from the computer 12 to the network 13 in this same format. Thus only those messages compatible with the Q.931 specification are provided to the digital telephone from the computer and to the computer from the digital telephone.

Figure 2:
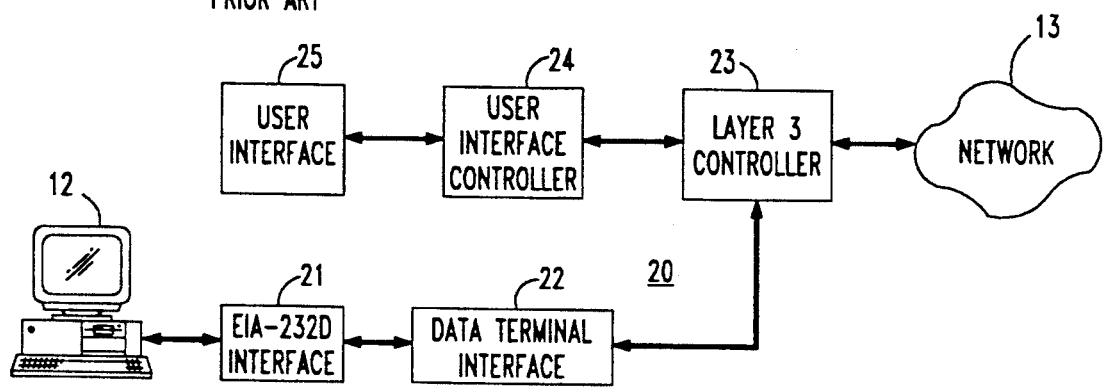
FIG. 2 shows a prior art arrangement of a terminal adapter connected to a digital network and to a computer.

Referring next to FIG. 2, there is shown a prior art arrangement of a terminal adapter (TA) 20 which may be, for example, a digital telephone and which connects to a network 13. The TA 20 includes an EIA-232-D interface 21, a data terminal interface 22 for data terminal equipment (DTE), a layer 3 controller 23, a user interface controller 24, and a user interface 25 which contains any displays, buttons and alerters. Also shown in FIG. 2 is a DTE 12 which may be a personal computer. This DTE 12 connects to the TA 20 and controls those CCITT Recommendations contained in Q.931 for originating and answering a call, including such switching features as conference, transfer, call forwarding and electronic directory service. The data terminal interface 22 also cooperates with the DTE 12 in controlling those CCITT Recommendations contained in Q.931 for receiving a call, including the providing of such information as calling party name, directory number and feature status.

In performing an operation such as that required for originating a call, the DTE 12 provides a control message through the EIA-232-D interface 21 to the data terminal interface 22. The data terminal interface 22 interprets this control message from the DTE 12 and transmits a corresponding message to the layer 3 controller 23. The controller 23, in turn, sends a corresponding Q.931 specification message on to the network 13. Because the DTE 12 has no direct control over the user interface controller 24 or the user interface 25, the message provided by it to the layer 3 controller 23 will, in some cases, also control the operation of the user interface controller 24. By way of example, in a telemarketing type operation where the DTE 12 is programmed to dial a particular number, when the number is dialed the corresponding information is provided to the layer 3 controller 23 and to the network 13. Since the DTE 12 has no control over the user interface controller 24, this controller is activated by the dialing operation providing this information to the user interface controller 24 and the user interface 25. As a result, the user first hears a dial tone and then the call progress at the user interface 25.

In performing an operation such as that required for answering a call, the DTE 12 is programmed so that in certain applications it determines whether or not to allow the user interface 25 to provide an alerting signal for a user. During the receipt of an incoming call from the network 13, the calling information is routed through the layer 3 controller 23 through the data terminal interface 22, via the EIA 232-D interface 21 and to the DTE 12. At the same time in this arrangement, however, the calling information is also routed from the controller 23 through the user interface controller 24 and to the user interface 25. Since the incoming calling information is provided simultaneously both to the data terminal interface 22 and to the user interface controller 24, such action as either a visual or audible alerter in the interface 25 is activated alerting a user to respond.

Figure 3:
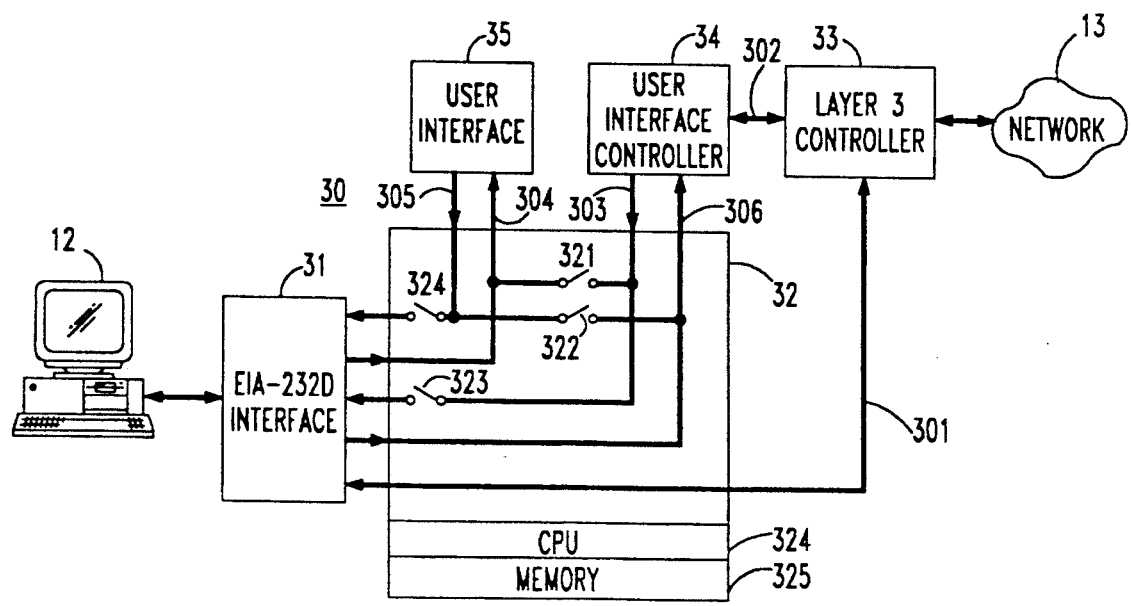
FIG. 3 shows an improved terminal adapter for connecting to a digital network and also shows a computer illustratively connected to the terminal adapter in accordance with the invention.

Referring next to FIG. 3, there is shown in accordance with the invention an improved TA 30 for connecting to the network 13 and capable of operating in accordance with CCITT Recommendation Q.931. Although described as operating in an ISDN system, it is to be understood that the TA 30 is similarly operable in other digital systems, such as, for example, a DCP system. The TA 30 includes an EIA-232-D interface 31, a DTE data terminal interface 32, a layer 3 controller 33, a user interface controller 34 and a user interface 35. Also shown in FIG. 3 is a DTE 12 which is illustratively connected to the TA 30 through the EIA-232-D interface 31. Such DTE may be a personal computer.

The TA 30 has multiple operating modes which are advantageously defined by the position of switches 321 through 324 in the data terminal interface 32. The state of these switches is controlled by a central processing unit (CPU) and a memory associated with the data terminal interface 32. It is to be understood that this CPU and memory comprise the processing unit for the TA 30 and is also associated with and controls the functional components 31 and 33 through 35. The CPU also communicates with the DTE 12 via the EIA-232-D interface 31 by providing to and responding to information from this DTE. A telephone unit containing a suitable CPU and memory and is usable as the TA 30, in accordance with the teaching disclosed herein, is the AT&T 7507 ISDN voice terminal which is commercially available.

In a first operating mode, operation of the TA 30 is in a manner which assumes that the DTE 12 is not present, or present and not activated. Switches 321 and 322 are closed and switches 323 and 324 are open in this operating mode. This first operating mode also is defined as the default mode which allows the TA 30 to operate in a conventional manner with messages going directly between the user interface controller 34 and the user interface 35.

In all other of the multiple operating modes, the DTE 12 is determined to be both present and activated. While under the control of the DTE 12, the TA 30 may exist in one or more of these operating modes in accordance with the configuration required for execution of the desired function. Operation of the TA 30 in a second operating mode is such that messages from the user interface controller 34 and destined for the user interface 35 are routed via the EIA-323-D interface 31 to the DTE 12 and then to the user interface controller 34. This routine is achieved by having switch 323 closed and switch 321 open in the data terminal interface 32. Similarly, messages from the user interface 35 and destined for the user interface controller 34 are routed via the EIA-323-D interface 31 to the DTE 12. This routing is achieved by having switch 324 closed and switch 322 open in the data terminal interface 32. Operation of the TA 30 in a third operating mode is such that messages from the user interface 35 are intended to be routed only to the DTE 12 and a reply message from the DTE 12 returned to the user interface 35. This routing is achieved by having switch 324 closed and switch 322 opened in the data terminal interface 32. Operation of the TA 30 in a fourth operating mode is such that messages from the user interface controller 34 are intended to be routed only to the DTE 12 and a reply message from the DTE 12 returned to the user interface controller 34. This routing is achieved by having switch 323 closed and switch 321 opened in the data terminal interface 32. Through this routing, total control of all messages to and from both the user interface controller 34 (and thus the network 13) and the user interface 35 is therefore placed under the control of the DTE 12.

Operation of the TA 30 for receipt of control messages from the network 13 is such that these incoming messages are provided to the layer 3 controller 33. Certain characteristics such as information indicative of a number of a calling station are associated with the incoming messages. The layer 3 controller 33 is directly connected to the EIA-232-D interface 31 via line 301. Thus for an incoming message from network 13, a corresponding message is provided over this line 301 to inform the DTE 12 that an incoming call has been received. The same message provided over line 301 is also provided over line 302 which connects the layer 3 controller 33 to the user interface controller 34. When a control message over line 302 is received by the user interface controller 34, this controller takes this information and converts it into an understandable form such as turning on a lamp, or activating a speaker, etc., and applies this signaling message over line 303. Since switch 321 is open and switch 323 is closed in the second operating mode, this message is forwarded to the DTE 12 which may, in turn, simply forward this message and its associated characteristics over line 304 to the user interface 35 where it is ultimately produced so the user of the TA 30 may perceive the message. Alternatively, the DTE 12 may, upon receipt of this message, substitute therefor its own customized message or replace with another message temporarily desired by a user in accordance with the intended application for this received message.

Operation of the TA 30 for generation of outgoing control messages from the user interface 35 is such that these messages are all provided to the DTE 12 while in the second operating mode. For these outgoing messages, such as those generated by a button-push, the user interface 35 interfaces with a person going off-hook and genrates a control message on line 305 which goes to the DTE 12 via the EIA-232-D interface 31. The DTE 12 may either route the message in its current form as generated by the user interface 35 or it may advantageously generate a substitute message and route this substitute message to the user interface controller 34 on line 306. This controller 34, in turn, provides the control message to the layer 3 controller 33 where it is provided to the network 13. Alternatively, this control message once provided to the DTE 12 is preferably provided over line 301 directly to the layer 3 controller 33 and to the network 13, especially in those instances where no change is required to be made to the control message by the user interface controller 34.

In providing a control message from the user interface 35 directly to the DTE 12, as herein before indicated, the TA 30 advantageously permits the DTE 12 to change this control message to any one of a variety of different substitute messages which are returned to the user interface 35. These messages may be more numerous than those that are understood by the user interface controller 34 which is responsive only to those control messages contained in the CCITT Recommendations Q.931 specification. As a result, the TA 30 thus allows for easy implementation of local features that might be desired by a user of the TA 30, these features not being set forth in CCITT Recommendations but nevertheless being easily definable by softkeys at the user interface 35. This is feasible in TA 30 because of the direct communications possible between the user interface 35 and the DTE 12 wherein the use of a digital protocol standard is not required. By way of example, a directory is generated in the DTE 12 and its access is controlled by one or more user defined softkeys contained in the TA 30. Depending upon the manner in which the data is stored, the data may be accessed in a number of ways, the limitation being the number of usable definable softkeys the user makes available for accessing this data. Thus when a directory lookup is desired, a request entered by a predefined softkey on the user interface 35 is sent to the DTE 12, the DTE obtains this information and provides it in the desired format back to the user interface 35 over the signal lead 304.

Figure 4:
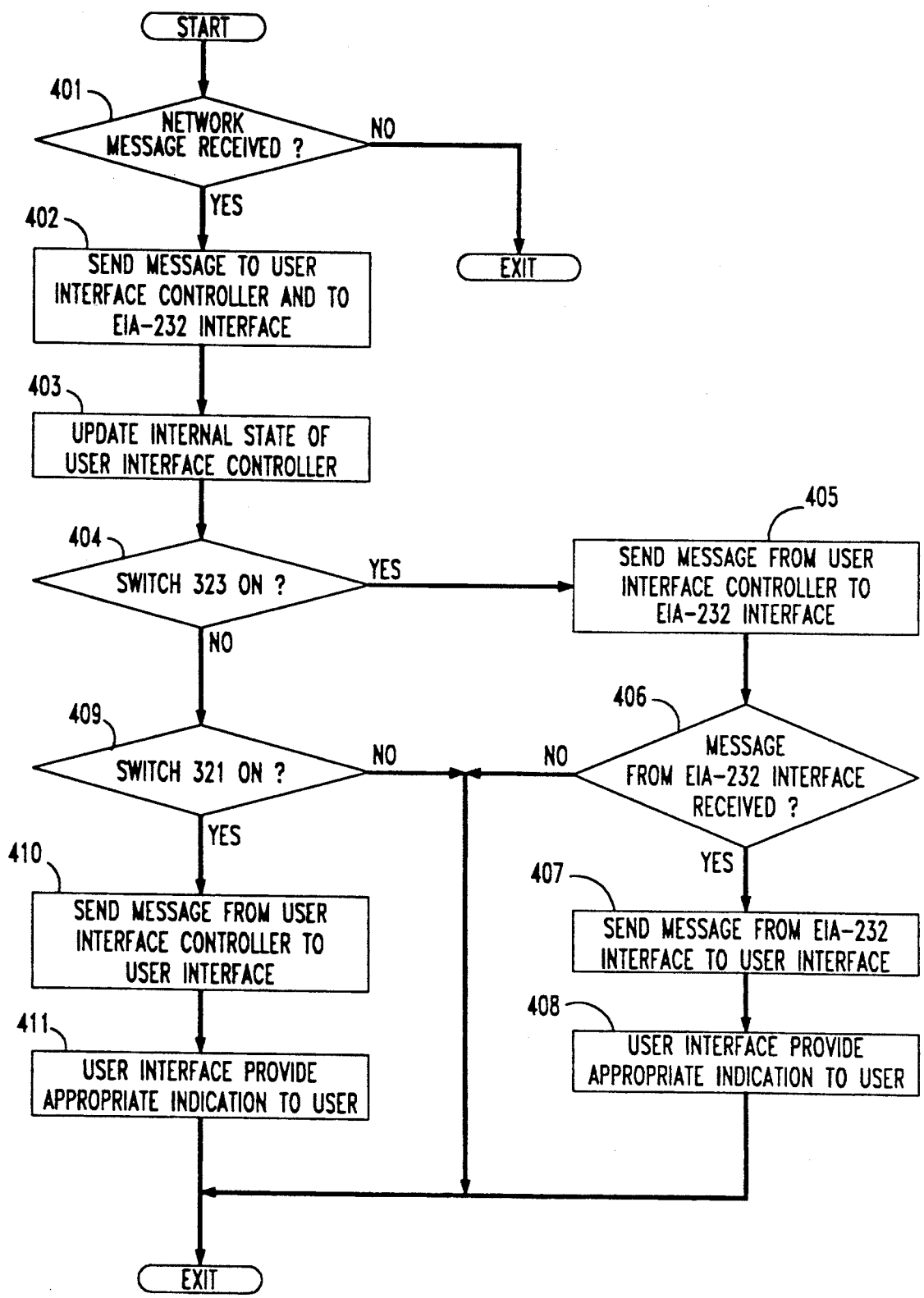
FIG. 4 shows a flow chart illustrating in combination the operation of the terminal adapter and computer of FIG. 3 in processing incoming call information received by the terminal adapter from the network in accordance with the invention.

Referring now to FIG. 4, there is shown a flow chart illustrating in combination the operation of the TA 30 and DTE 12 shown in FIG. 3 in processing incoming control messages received by the TA 30 from the network 13. The process is entered at decision 401 where it is determined whether a network message has been received. If a network message has not been received at this decision, the process is exited. If a network message is received at decision 401, the process advances to step 402 where the received message is sent to both the user interface controller 34 and the EIA-232-D interface 31. Next the process advances to step 403 where the user interface controller 34 is updated with the type of network message received. This updating of the user interface controller 34 is so that the state of the user interface controller 34 is made consistent with the network such that in the event that the DTE 12 becomes inoperative, the TA 30 will still be able to continue operating while the switches 321 through 324, shown in FIG. 3, go to their default state.

The process next advances to decision 404 where a determination is made as to whether switch 323 is in the "on" state. If switch 323 is in the "on" state, then the process advances to step 405 where the message is sent from the user interface controller 34 to the EIA-232-D interface 31. The process then advances to the decision 406 where a determination is made as to whether a message from the EIA-232-D interface 31 has been received. If not, the process is exited. If a message has been received, however, the process advances to step 407 where the message from the interface 31 is sent to the user interface 35. The process next advances to step 408 where the user interface provides an appropriate indication to a user. From this step, the process is exited.

Referring once again to decision 404, if switch 323 is in the "off" state then the process advances to decision 409. At decision 409 if switch 321 is in the "on" state, the process advances to step 410 where the message is sent from the user interface controller 34 to the user interface 35. The process next in step 408 provides an indication to the user through visual or audible indicators as appropriate in the user interface 35.

Figure 5:
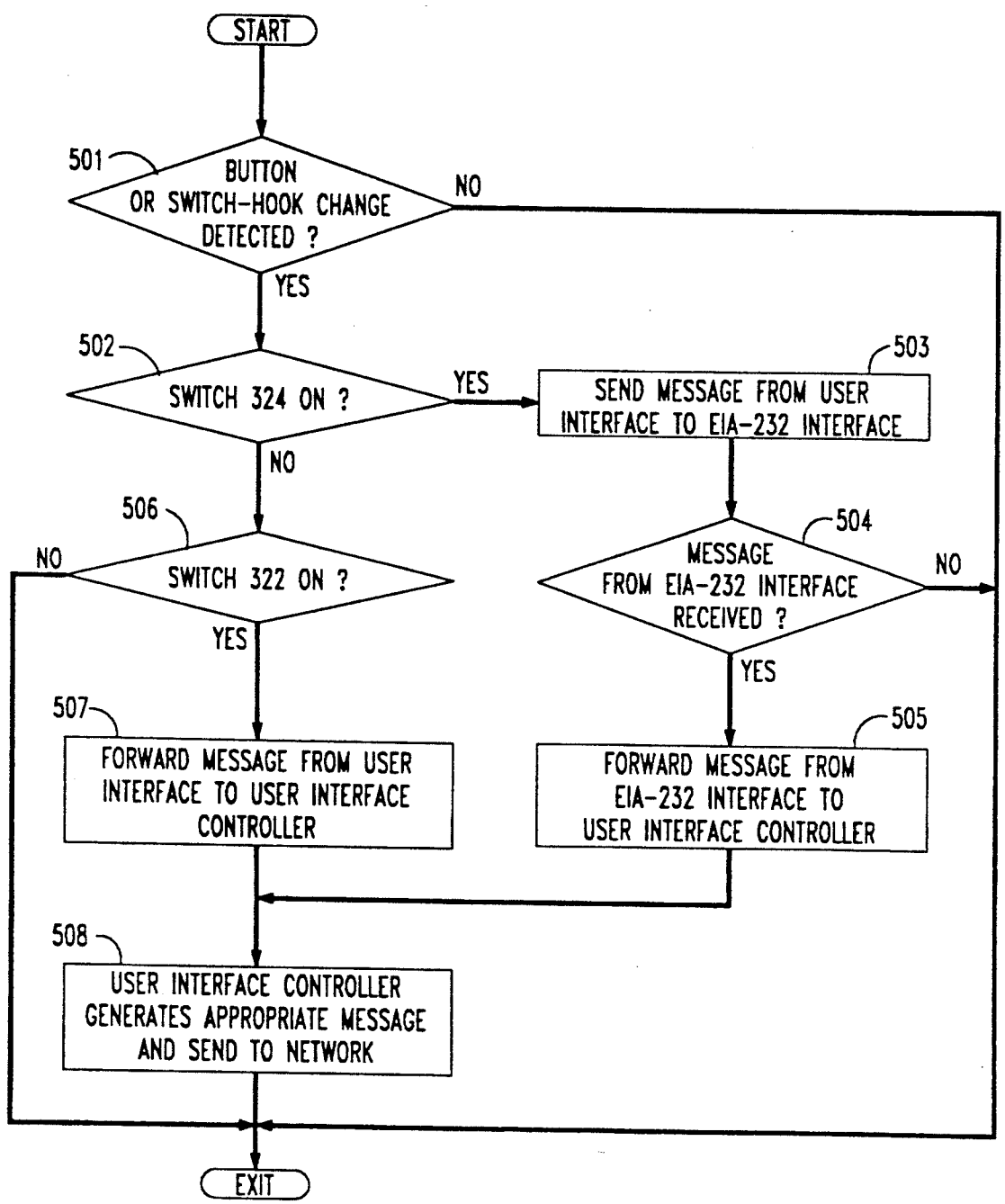
FIG. 5 shows a flow chart illustrating in combination the operation of the terminal adapter and computer of FIG. 3 in processing local user provided information received by the terminal adapter in accordance with the invention.

Referring now to FIG. 5, there is shown a flow chart illustrating in combination the operation of the TA 30 and DTE 12 shown in FIG. 3 in processing user provided information received by the TA 30 through the user interface 35. The process is entered at step 501 where user provided input, such as a button-push selecting a particular operation or a switch-hook state change, is detected. If a button-push or switch-hook state change is not detected at this decision, the process is exited. If a button-push or switch-hook state change is detected, however, the process advances to the decision 502, where it determines whether switch 324 is in the "on" state. If switch 324 is in the "on" state, in step 502, the message from the user interface 35 is sent to the EIA-232-D interface 31 and on to the DTE 12 for processing in accordance with an application program contained therein. In step 503 the message provided by the user interface is reflective of the button-push or switch-hook state change that is detected in step 501. The process next advances to decision 504 where a determination is made as to whether a reply message from the EIA-232-D interface 31 has been received. If no message is received, the process is exited. If a reply message is received, however, the message is forwarded from this interface 31 to the user interface controller 34. The process next advances to step 508.

Referring once again to decision 502, if switch 324 is not in the "on" state, the process advances to decision 506 where a determination is made as to whether the switch 322 is in the "on" state. If switch 322 is not in the "on" state in decision 506, the process is exited. If in this decision, the switch 322 is in the "on" state, then the process advances to step 507 where the message reflective of the button-push or switch-hook state change contained in the user interface 35 is forwarded to the user interface controller 34. The process next advances to step 508 where the user interface controller 34 interprets the message and generates a message to the layer 3 controller 33. Also in this step, the layer 3 controller 33 generates the appropriate CCITT Q.931 specification message to the network 13. From this step the process is exited.

Figure 6:
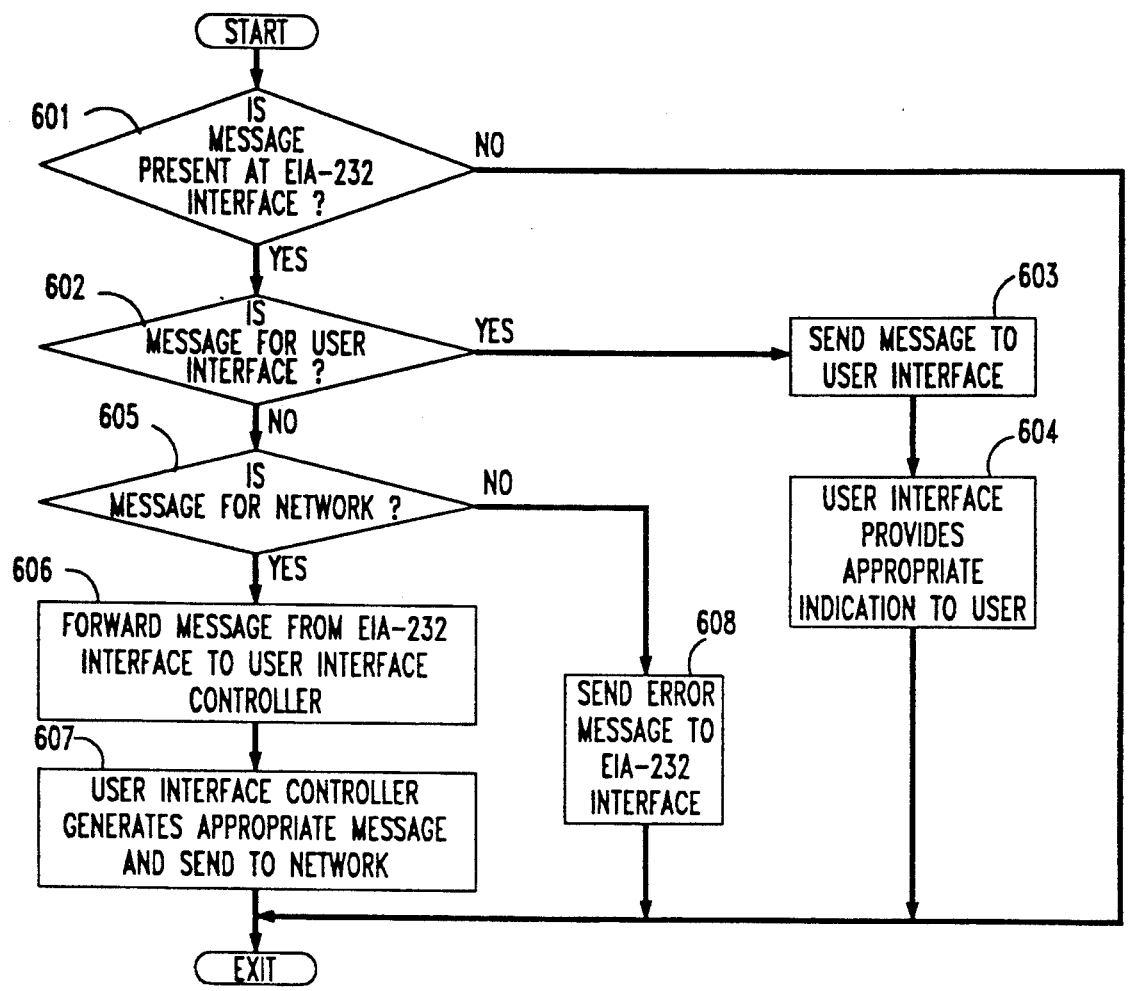
FIG. 6 shows a flow chart illustrating the operation of the terminal adapter of FIG. 3 in processing message simulations received from the computer of FIG. 3 in accordance with the invention.

Referring next to FIG. 6, there is shown a flow chart illustrating the operation of the TA 30 shown in FIG. 3 in processing message simulations that are generated at the DTE 12. These messages may be generated in response to messages initiated by a user of the TA 30; they may be generated in response to incoming messages from the network; or they may be generated automatically in accordance with an application program provided in the DTE 12.

The process is entered at step 601 where a determination is made as to whether a message is present at the EIA-232-D interface 31. If no message is present, the process is exited. If a message is present, then the process advances to step 602 where it is determined whether the message is for the user interface 35. If the message is for the user interface 35, the process advances to step 603 where the message is sent to the user interface 35. And the process next advances to step 604 where the user interface 35 provides the appropriate indication to the user. After this step, the process is exited. If the message is not for the user interface in step 602, however, the process advances to decision 605. At this decision, a determination is made as to whether the message is one destined for the network, such as a button-push or switch-hook state change simulation message. If so, the process advances to step 606 where the message is sent to the user interface controller 34. From this step, the process advances to step 607 where the user interface controller 34 along with the layer 3 controller 33 generates the appropriate CCITT Recommendations Q.931 message to the network 13. From this step the process is exited. If at step 605, the message at this decision is determined not to be a message for the network, then an error signal is sent to the EIA-232-D interface 31. From step 608 the process is also exited.

Many implementations of the invention are possible in achieving the desired broad scope of information management and control of this information for a user in his or her communication environment. One such implementation is that of call screening wherein a user may tailor this feature to his or her specific need. In the implementation of call screening in accordance with the invention, as shown in FIG. 3, and described in varying detail in the flow charts of FIGS. 4, 5 and 6, an incoming call message is received by the layer 3 controller 33 and then routed to the DTE 12 as well as to the user interface controller 34. Incoming call information, or incoming calling line identifier (ICLID), is also provided by the layer 3 controller 33 to the DTE 12 over line 301 attaching these units in the TA 30. The information provided to the user interface controller is that which causes the user interface 35 to respond to the incoming call, i.e., causes the flashing of appropriate lights or the actuation of acoustic alerters on the user interface 35, for example.

Certain features for a user are provided through call screening. They are customer alerting, or no alerting, and also certain adjunct devices may be activated or not activated as desired by a user as he or she programs the DTE 12 with the desired applications. One such application for call screening is to program the DTE 12 to recognize and respond to a particular calling number so that when an incoming call having this number is received, certain actions are taken. Once such action would be to place an adjunct unit such as a speakerphone off-hook automatically so that the local user can automatically converse with a distant party. Alternatively, an incoming call having an identified number can automatically be routed to an answering machine whereby the caller may receive a message specifically prepared for him or her. Still further, the incoming call with the identified number could cause the DTE 12 to associate with it a distinctive ringing signal so that the user of the telephone would know immediately which party is calling based on the user selected distinctive ring. The number of distinctive rings possible are not in any way limited by the CCITT Recommendation Q.931 specification, but rather only by the number of distinctive recognizable rings the user is able to program his or her telephone list with and to remember.

Another such implementation of the invention in achieving a broad scope of information management and control of this information for a user in his or her communication environment is in the processing of messages generated at the user interface 35 shown in FIG. 3. The DTE 12 enables the defining of softkeys as well as user definable, fixed buttons on the TA 30. A softkey definable button is generally located adjacent to a display which defines the functionality for this button whereas a user definable fixed button is one which generally requires some label for defining the functionality for the button.

In the operation of the TA 30, a control message representative of a button-push to a user definable fixed button or softkey definable button on the user interface 35 is transmitted to the DTE 12. The DTE 12 will, based on the applications program contained therein, provide access to one of a number of features in response to the input of this control message.

One possible feature from the DTE 12 is that it will provide a local directory lookup service. Thus the activation of the user definable fixed button or softkey definable button provides back to the user of the telephone a display which then shows a certain menu. Another possible feature from the DTE 12 is that it provides one button custom conference calling in response to the activation of either a user definable fixed button or a softkey definable button on the user interface 35. A user could have a preselected group, for example, that he or she calls once a week at a certain time. The telephone numbers of each one of the members of the group could be provided in the memory of the DTE 12 and upon the entry of a selected number by the user, indicative of the conference, an appropriate message will be provided to the DTE 12, which in turn will generate all of the telephone numbers, calling each one, providing each with a prerecorded announcement and connecting the parties so that the conference call is established. Alternatively, the DTE 12 could also be programmed, in as much as it has an internal clock, to automatically generate this custom call on a Monday morning at 9:00 o'clock, for example, and when the parties are all on the line, the user could also be signaled to join the conference.

Yet another implementation of the invention in achieving a broad scope of information management and control of this information for a user in his or her communication environment is through call restriction which is includable in the applications program in the DTE 12. In call restriction, a user of a particular telephone is not permitted to call certain selected locations which can, for example, include all long distance calls which require the dialing of an area code. This is easily determined in a very simplistic way by having the DTE 12 monitor and respond when an area code is dialed. Once an area code is dialed, and this is easily determined since any number wherein the second digit is a one or zero is an area code, the DTE 12 immediately recognizes this as being a long distance call and can evoke call restriction for that telephone call. Other more sophisticated means of call restriction are clearly available, however. For example, selected calling to some area codes and other numbers may be restricted by including a memory map containing such codes and numbers in the memory of the DTE 12.

Another implementation of the invention is in automatic call distribution. There are a number of arrangements wherein automatic call distribution may be employed. A first such arrangement is one wherein received calls are distributed according to the location of the origin of the call which is determined by a caller's ID. By way of example, many callers may call to one specific location from many different regions of the country which are all predefined in the DTE 12 in its memory map. When the DTE 12 receives a call from a certain region of the country, it goes to its memory map, determines an agent who is specifically assigned that particular region and then routes the call to this agent. The DTE 12 performs this operation for each one of the different assigned regions.

A second arrangement is one wherein the DTE 12 provides automatic call distribution for an application such as telemarketing. In this type of call distribution arrangement, certain agents are positioned at telephone stations where they respond to incoming calls from outsiders who call either to buy or to respond to some type of previously made offer. This automatic call distribution feature operates in such a fashion that the DTE 12 arranges the incoming calls so that each one of the agents at each station will be assigned a proportionate number of calls according to certain criteria. The first assigning criterion is that the incoming call is routed to an available telephone station, that is, to an agent who is not then busy, and then in decreasing order of priority other assigning criteria such as, of the agents who are not then busy, routing the call to the one of these agents who has had the fewer number of phone calls over a defined period.

Figure 7:
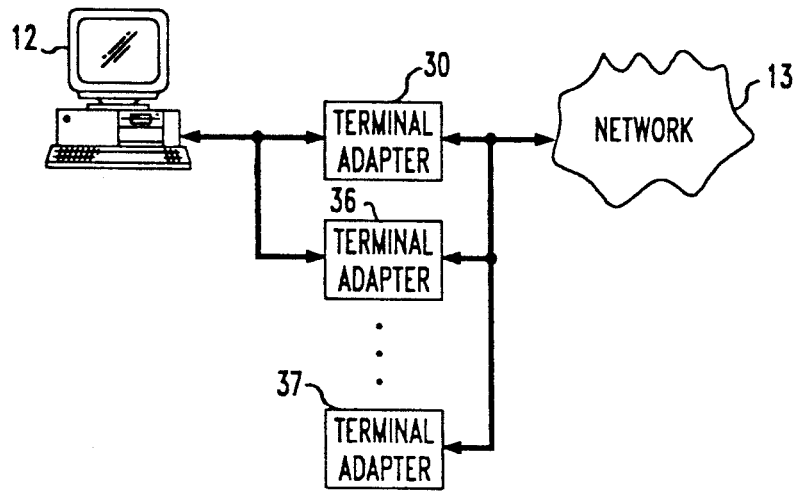
FIG. 7 shows a plurality of improved terminal adapters for connecting to a digital network and to a computer, in accordance with the invention.

In the above two described automatic call distribution features, there are multiple telephones being controlled by a single DTE 12 as shown in FIG. 7. This is accomplished by providing each one of the telephones at terminal adapters 30, 36 and 37 a connection to the DTE 12 through a standard EIA-232-D interface. Personal computers that are capable of accommodating multiple interface ports are, for example, the AT&T 6286 WGS and the AT&T 6386 WGS. These computers accommodate interface cards having typically eight to sixteen EIA-232-D interfaces. Multiple interface cards may be employed in these computers, thus providing 16, 32 and even 64 interfaces for connecting the telephones.

Another implementation of the invention is in providing a feature which allows for the interaction of the TA 30 for services available only on the DTE 12. If the DTE 12 is also connected to the data line in the digital network, the DTE 12 is able to interact with the data line by retrieving any messages thereon and then providing these messages directly to the user interface 35 on the TA 30 for the user to access. The DTE 12 may provide an indication of incoming electronic mail over the telephone by displaying, for example, a sender's name, time, and the subject at an appropriate output display device on the telephone.

Various other implementations of this invention are contemplated and may obviously be resorted to by those skilled in the art without departing from the spirit and scope of the invention as hereinafter defined by the appended claims.

We claim:

1. In a terminal adapter arranged for attaching to a digital network and for attaching to a data terminal, a data terminal interface comprising:
    means for receiving an incoming control message from the digital network for a user interface in the terminal adapter;
    means for configuring the data terminal interface for operating in a plurality of operating modes;
    means for routing said incoming control message from the digital network directly to the user interface while said data terminal interface is configured in a first one of the plurality of operating modes;
    means for routing said incoming control message from the digital network to the data terminal in accordance with a first protocol while said data terminal interface is configured in a second one of the plurality of operating modes; and
    means for forwarding to said user interface from said data terminal a substitute message generated by said data terminal, said substitute message being forwarded in a format different from said first protocol while said data terminal interface is configured in said second one of the plurality of operating modes.

2. The data terminal interface of claim 1 wherein the substitute message is generated in response to characteristics associated with the incoming control message.

3. The data terminal interface of claim 2 wherein the substitute message includes identifying information indicative of a number of a calling station included in the characteristics associated with the incoming control message, the identifying information being stored in the data terminal for inclusion in the substitute message being forwarded to the user interface.

4. The data terminal interface of claim 3 wherein the identifying information differs for each one of a plurality of numbers respectively associated with a plurality of predefined calling stations, the appropriate identifying information being included in the substitute message corresponding to each control message received from each predefined calling station.

5. The data terminal interface of claim 4 further including means for generating an alerting signal at the user interface, and wherein the identifying information associated with each one of the plurality of numbers is arranged for generating either a distinctive alerting signal, a common alerting signal or no alerting signal at the user interface.

6. The data terminal interface of claim 3 wherein the identifying information differs for each one of a plurality of numbers representative of calling stations, the appropriate identifying information being provided in response to receipt by the data terminal of a predetermined portion of the number of the calling station, the predetermined portion of the number being reflective of a location of origin for the calling station.

7. In a terminal adapter arranged for attaching to a digital network and for attaching to a data terminal, a data terminal interface comprising:
    means for receiving a control message from a user interface in the terminal adapter for transmission to the digital network;
    means for configuring the data terminal interface for operating in a plurality of operating modes;
    means for routing the control message from the user interface to the data network while said data terminal interface is configured in a first one of the plurality of operating modes;

means for routing the control message from the user interface to the data terminal while said data terminal interface is configured in a second one of the plurality of operating modes; and means for generating at the data terminal a substitute message for forwarding to the digital network while said data terminal interface is configured in said second one of the plurality of operating modes.

8. The data terminal interface of claim 7 wherein the substitute message comprises a plurality of telephone numbers, each of these telephone numbers being dialed by the data terminal for establishing a connection between a plurality of called stations having these numbers and the terminal adapter.

9. In a terminal adapter arranged for attaching to a digital network and for attaching to a data terminal, a data terminal interface comprising:

means for configuring the data terminal interface for operating in a plurality of operating modes;

means for receiving a first control message from a user interface in the terminal adapter for routing said first control message in response to characteristics associated with said control message while said data terminal interface is configured in a first one of the plurality of operating modes, and the receiving means routing said first control message to the data terminal while said data terminal interface is configured in a second one of the plurality of operating modes, the data terminal generating a second control message in response to receipt of this first control message; and means for routing said second control message from the data terminal in response to characteristics associated with the second control message.

10. The data terminal interface as in claim 9 wherein the characteristics associated with the second control message include routing information for forwarding the second control message to the digital network.

11. The data terminal interface as in claim 9 wherein the characteristics associated with the second control message include routing information for forwarding the second control message to the user interface.

12. The data terminal interface as in claim 11 further comprising at least one user definable button on the user interface, and wherein the characteristics associated with the second control message further include user definable information provided in response to the activation of the user definable button on the user interface.

13. The data terminal interface as in claim 12 wherein the user definable button comprises a softkey definable button on the user interface.

14. In a digital communication system, a plurality of terminal adapters arranged for attaching to a digital terminal and for attaching to a digital network over a plurality of respectively associated lines, each of the plurality of terminal adapters comprising:

means for routing an incoming control message from the digital network to the data terminal in accordance with a first protocol; and means for receiving at each of the plurality of terminal adapters a substitute message generated by said data terminal in response to receipt of this control message, said data terminal routing said substitute message in a format different from said first protocol to one of the plurality of terminal adapters in response to characteristics associated with the substitute message.

15. The plurality of terminal adapters as in claim 14 wherein the characteristics associated with the substitute message includes routing information for returning the substitute message to that one of the terminal adapters which received the control message from the network.

16. The plurality of terminal adapters as in claim 14 wherein the characteristics associated with the substitute message includes routing information for forwarding the substitute message to another one of the terminal adapters other than the terminal adapter which received the control message from the network.

17. The plurality of terminal adapters as in claim 14 wherein the routing information is determined by the relative number of telephone calls received over a predetermined time period by each one of the plurality of terminal adapters, the substitute message being forwarded to the terminal adapter having the fewer number of calls in the predetermined time period.

18. The plurality of terminal adapters as in claim 16 wherein the routing information is determined by the location of origin of an incoming call, each of the plurality of terminal adapters being assigned to receive telephone calls from a particular location of origin, and the substitute message being forwarded to the terminal adapter assigned for receiving calls from the location of origin for the incoming call.

19. A method of providing control for a terminal adapter arranged for attaching to a digital network and for attaching to a data terminal, the method comprising the steps of:

receiving an incoming control message from the digital network for a user interface in the terminal adapter;

routing said incoming control message from the digital network directly to the user interface while said data terminal interface is configured in a first one of a plurality of operating modes;

routing said incoming control message from the digital network to the data terminal in accordance with a first protocol while said data terminal interface is configured in a second one of the plurality of operating modes;

generating a substitute message at the data terminal while said data terminal interface is configured in said second one of the plurality of operating modes; and forwarding to said user interface from said data terminal the substitute message generated by said data terminal, said substitute message being forwarded in a format different from said first protocol.

20. The method of claim 19 wherein the substitute message provided by the generating step is generated in response to characteristics associated with the incoming control message.

21. The method of claim 20 further including the step of storing in the data terminal identifying information indicative of a number of a calling station, the number of the calling station being included in the characteristics associated with the incoming control message, and the step of including the identifying information in the substitute message being forwarded to the user interface.

22. The method of claim 21 further including the step of providing distinctive identifying information for each one of a plurality of numbers respectively associated with a plurality of predefined calling stations, the distinctive identifying information being included in the substitute message provided in response to each control message received from each predefined calling station.

23. The method of claim 21 further including the step of providing distinctive identifying information for each one of a plurality of numbers representative of locations of origin for each of a plurality of calling stations, the distinctive identifying information being provided in response to receipt by the data terminal of a predetermined portion of the number of the calling station for determining the location of origin for the calling station.

24. A method of providing control for a terminal adapter arranged for attaching to a digital network and for attaching to a data terminal, the method comprising the steps of:
  receiving a first control message from a user interface in the terminal adapter for routing said first control message in response to characteristics associated with said control message while said data terminal interface is configured in a first one of a plurality of operating modes, and the receiving step routing said first control message to the data terminal while said data terminal interface is configured in a second one of the plurality of operating modes;
  generating in the data terminal a second control message in response to receipt of this first control message while said data terminal interface is configured in the second one of the plurality of operating modes; and
  routing said second control message from the data terminal in response to characteristics associated with the second control message.

25. The method of claim 24 wherein the characteristics associated with the second control message include routing information for forwarding the second control message to the digital network.

26. The method of claim 24 wherein the characteristics associated with the second control message include routing information for forwarding the second control message to the user interface.

27. The method of claim 26 wherein the data terminal interface includes at least one user definable button, and wherein the characteristics associated with the second control message further include user definable information provided in response to the activation of the user definable button on the user interface.

28. The method of claim 27 wherein the user definable button comprises a softkey definable button on the user interface.

* * * * *